United States Patent [19]

Knuth et al.

[11] Patent Number: 5,418,839

[45] Date of Patent: * May 23, 1995

[54] ENVIRONMENTAL ADAPTIVE MECHANISM FOR CHANNEL UTILIZATION IN CORDLESS TELEPHONES

[75] Inventors: Stephen B. Knuth, Mission Viejo; Oded Yossifor, Torrance; Kenneth R. Core, Stanton, all of Calif.

[73] Assignee: PhoneMate, Inc., Torrance, Calif.

[ * ] Notice: The portion of the term of this patent subsequent to Mar. 23, 2010 has been disclaimed.

[21] Appl. No.: 34,239

[22] Filed: Mar. 22, 1993

Related U.S. Application Data

[63] Continuation-in-part of Ser. No. 686,018, Apr. 12, 1991, Pat. No. 5,197,093, which is a continuation-in-part of Ser. No. 508,663, Apr. 13, 1990, abandoned.

[51] Int. Cl.$^6$ ............ H04M 11/00; H04Q 7/00
[52] U.S. Cl. ........................ 379/61; 379/58; 379/62; 455/341
[58] Field of Search ............ 379/56, 58, 61, 59, 379/62, 63; 455/34.1, 361, 76

[56] References Cited

U.S. PATENT DOCUMENTS

| | | |
|---|---|---|
| 3,806,819 | 4/1974 | Leonard . |
| 4,198,605 | 4/1980 | Yamashita et al. . |
| 4,461,036 | 7/1984 | Williamson et al. . |
| 4,768,219 | 8/1988 | Yamagata et al. . |
| 4,768,220 | 8/1988 | Yoshihara et al. . |
| 4,783,844 | 11/1988 | Higashiyama et al. . |
| 4,955,073 | 9/1990 | Sugayama . |
| 4,989,231 | 1/1991 | Ishikawa . |
| 5,038,399 | 8/1991 | Bruckert . |
| 5,044,010 | 8/1991 | Freikiel et al. . |
| 5,073,932 | 12/1991 | Yossifor et al. ............ 379/62 |
| 5,093,927 | 3/1992 | Shanley ............ 455/34.1 |
| 5,197,093 | 3/1993 | Knuth et al. ............ 379/61 |
| 5,237,603 | 8/1993 | Yamagara et al. ............ 379/61 |
| 5,287,400 | 2/1994 | Saegusa ............ 379/58 |

FOREIGN PATENT DOCUMENTS 0046334  2/1989  Japan ...................... 379/62

OTHER PUBLICATIONS

Sony Corporation, "Cordless Telephone Operating Instructions" 1992.
Phonemate Brochure for Model 2900 Cordless Telephone With Speakerphone, PhoneMate, Inc., Torrance, Calif., Nov., 1990.
AT & T Brochure for Cordless Answering System 5600, 1991.
JC Penney Spring/Summer Copyright 1988, p. 708 #1 and #2.

*Primary Examiner*—Curtis Kuntz
*Assistant Examiner*—William Cumming
*Attorney, Agent, or Firm*—Frishauf, Holtz, Goodman & Woodward

[57] ABSTRACT

A cordless telephone has an improved mechanism for scanning and selecting channels by adapting to the channel usage patterns of the local environment having a plurality of channels available for usage. A prioritized list of channels having the highest probability of being interference free is produced. The channels are pre-scanned during idle time, so quick acquisition of an available channel is possible. Accordingly to another feature, a scan subset comprising a first group of clear channels is selected upon system powerup. The available channels are scanned during the idle time to select a preferred channel subset which comprises channels which are the most interference free. A channel or channels within the preferred channel subset which experience no or little interference over an extended period of time then is assigned to a clear channel subset. The clear channel subset includes fewer channels than the preferred channel subset. Communication is carried out over a channel in the clear channel subset. This technique is highly efficient for communicating in the clearest channel with the least amount of delay. Memory requirements are reduced and power consumption is reduced.

31 Claims, 6 Drawing Sheets

ENVIRONMENTAL ADAPTIVE MECHANISM FOR CHANNEL UTILIZATION IN CORDLESS TELEPHONES

CROSS REFERENCE TO RELATED APPLICATION

This application is a Continuation-In-Part of application Ser. No. 07/686,018, filed Apr. 12, 1991, now U.S. Pat. No. 5,197,093 which in turn is a Continuation-In-Part of Ser. No. 07/508,663, filed Apr. 13, 1990, now abandoned, the entire contents of both of which are incorporated herein by reference.

BACKGROUND OF THE INVENTION

Cordless telephones which are capable of operating on more than one channel are well known. These products range in capability from a relatively simple two-channel crystal controlled design to the more sophisticated frequency synthesized techniques, which permit either manual channel changing or full scanning operation. In spite of its adding a significant cost burden to the product, multiple channel operation is the only effective method for dealing with channel interference that may be caused by other users of cordless telephones in the local vicinity or other electrical or electro magnetic sources of interference. This is particularly significant in highly urbanized areas where many cordless telephones and other electronic devices are used.

The functioning of cordless telephones in the United States is constrained by having to operate in one of ten channels within a relatively narrow frequency band width set by the FCC. In most urban environments, this may result in interference on one or more channels. Existing techniques for dealing with interference range from manually changing the channel of operation to using automatic frequency selection, depending on the individual cordless telephone model. To alleviate the interference problems associated with using a limited number of channels,(i.e., the present ten available channels) the FCC has proposed releasing an additional frequency bandwidth that would result in the availability of more channels. Although this would help reduce the interference problems, it would cause greater delay in selecting an interference-free channel because more channels may need to be scanned in order to choose the clear ones. For example, if the number of available channels were increased from 10 to 30, the time for scanning and locking onto the clearest channel could triple, in the worst case scenario.

Manual channel selection begins with the recognition by the user (during operation of the cordless telephone) that the symptoms being experienced are in fact interference related. In many instances, this can be far from obvious. Symptoms such as misdialing can be caused by interference, even in those models that have digital security codes. A trial-and-error process is typically used to find a new channel that is not subject to interference. For a two-channel product this channel changeover can be relatively quickly accomplished but has a corresponding low probability of success, particularly in urban environments where there is a very good chance that any two of the ten available channels will be used simultaneously by other cordless units in the neighborhood. For a ten-channel product, the chances of eventually finding a clear channel are good. However, the process of manually finding a clear channel among the ten available channels can be tedious.

An improvement is realized in products which automatically scan all ten channels every time the cordless telephone is used. This makes the entire spectrum available to the user and ensures that all communication will at least start on a clear channel. Significant problems still remain, however. Users of this type of system will immediately notice annoying delays in common operation. Lapses of several seconds may occur between placing the unit in the "Talk" mode and obtaining a dial tone or being able to begin a conversation. The principal reason for this is simply that scanning ten channels takes time. This problem is likely to get worse with the addition of more channels. To overcome this serious limitation, a more selective channel scanning method has been proposed in the prior art.

In the patent to Yamagoto et al et al., U.S. Pat. No. 4,768,219, the cordless telephone units, that is the handset and the base, independently scan all the channels during the standby mode and store in their respective memories three of those channels that have interference. When an outgoing call is thereafter to be made, or an incoming call is received, the unit skips those channels that are stored in either the memories of the base or handset and searches for a vacant channel, whereupon communication is established between the handset and the base.

Though the method disclosed in Yamagoto et al et al is a definite improvement over scanning all ten channels, it too has serious drawbacks. Even though the handset scans the frequency spectrum almost continuously, it begins its actual search for a vacant channel only when an incoming call is received or when an outgoing call is about to be made. Depending on the distribution of the vacant channels, this could cause considerable delay. Also, it does not discriminate between a channel that experiences interference less frequently than another channel. In most urban environments, it is not unrealistic to expect some channels to be used very frequently, some to be used sporadically and some very rarely. The device of Yamagoto et al et al is therefore perfectly capable of selecting the same channel that a neighbor's cordless phone uses, as long as it is not in use at the exact moment of scanning, even if the other six channels are completely unutilized.

Another serious disadvantage of the Yamagoto et al device is that the handset and the base may each attempt to communicate on channels that have been marked by the other as being noisy. This could happen because the handset and the base keep different channel storage areas (A1, A2, A3 in the handset and A1, A2, and A3 in the base). Also, the system's continuous scanning results in the reduction of handset battery life. This is due to the fact that the handset receiver must be powered up 100% of the time. The Yamagoto et al device does not learn or adapt to the channel usage patterns of its environment.

OBJECTS OF THE INVENTION

It is an object of the present invention to provide a channel selection and utilization apparatus for cordless telephones that learns channel usage patterns of the environment and adapts to it.

It is another object of the present invention to provide a channel selection and utilization apparatus for cordless telephones that prioritizes channels and stores them in a weighted order for preferential access.

It is another object of the present invention to provide a novel method of assessing the relative quality of scanned channels.

It is another object of the present invention to provide a channel selection and utilization apparatus for cordless telephones that is simple to use, is highly efficient, and is quick acting.

It is still another object of the present invention to provide a channel selection and utilization apparatus for cordless telephones that does not require manipulation by the user.

It is yet another object of the present invention to provide a channel selection and utilization apparatus for cordless telephones that optimizes the selection of an interference-free channel by selecting subsets of interference-free channels, which subsets are prioritized so that only channels of subsets are scanned during use, in order to balance the need for fast channel access and the need to conserve the battery life of the handset.

These and other objects and advantages of the present invention will become apparent from a review of the specification and accompanying drawings.

SUMMARY OF THE INVENTION

The present invention uses a scanning procedure in conjunction with statistical analysis of the channel interference patterns on given channels to give the cordless telephone the ability to select the channels of communication very efficiently, without the previously discussed disadvantages. It continuously adapts to the environment in which it is placed.

The present invention uses the system's idle time to survey and store in memory, channel usage or other source of interference by others in the local area. It uses this information to make an intelligent choice of frequency for its own use. As soon as the unit is plugged in by the consumer, it will scan each of the channels and begin to record usage and interference and keep a running "score" for each channel in memory. This information is updated periodically. The base and the handset will agree, based upon accumulated channel scores, what frequency to use when they are separated, along with a prioritized choice of several alternative channels in case the primary channel is busy at that time. This means that the system is always in a position to be ready, in advance of actual use, to choose a clear channel to operate on if one can be found, and if not, it will choose the channel having a record of being the next least used channel, based on long term statistics specific to the local environment stored in memory. Thus, the system is able to choose the channels with the highest probability of being free from interference.

Since the sampling process is continuous, each channel being scanned for example every ten minutes, the system will automatically "migrate" to a new preferred channel from a prior preferred channel if a neighbor should subsequently begin using a device that generates interference, such as a cordless phone, baby monitor, remote controlled toy, etc., which in the United States have the same frequency allocation as the cordless telephone. This ability to avoid the neighbor's channel also serves to enhance the privacy of conversation. Conversely, if a channel that was previously found to have interference develops a pattern of becoming clear, the system recognizes it quickly and begins to use it when necessary.

The problems associated with delay and low battery life are therefore resolved satisfactorily. Since the base and handset have pre-arranged the channel of operation, ten channel scanning at critical moments of operation is no longer necessary. This means that the handset receiver can resume a predominant "sleep" mode during standby, keeping current requirements to the minimum.

In the newer telephone channel allocation, wherein more than 10 (for example, 30) channels will be made available for cordless telephones, the present invention further uses a technique of sampling the channels, selecting a first subset of channels out of all of the available channels, the first subset of channels comprising a first group of clear sampled channels. The sampling is repeated over the first subset of channels and the detected occurrences of interference in each of the channels of the subset is stored. Each channel in the first subset of channels is assigned a cumulative value associated with a likelihood of interference being found on that channel, and a preferred channel subset is selected out of the first subset of channels on the basis of the cumulative value assigned to each channel. A clear channel can be selected from the preferred channel subset, and, during use, the channels of the preferred channel subset are continuously scanned or periodically scanned to automatically switch to the channel within the preferred channel subset which is substantially interference free, if interference should be found on the current channel in use.

According to a further feature of the invention, a clear channel subset may be selected from the preferred channel subset, and scanning can be carried out only over the channels of the clear channel subset during use, and switching between only channels of the clear channel subset is accomplished during use. This further increases the speed of operation of the scanning and selecting technique, and further reduces battery power usage.

It is to be noted that all of the foregoing is accomplished in a manner that is completely transparent to the user, not requiring any intervention by the user. The resultant speed of access, ease of operation, reduction in environmental and use-related interference, greatly enhances the operation of the cordless telephone.

DETAILED DESCRIPTION

Figure 1:
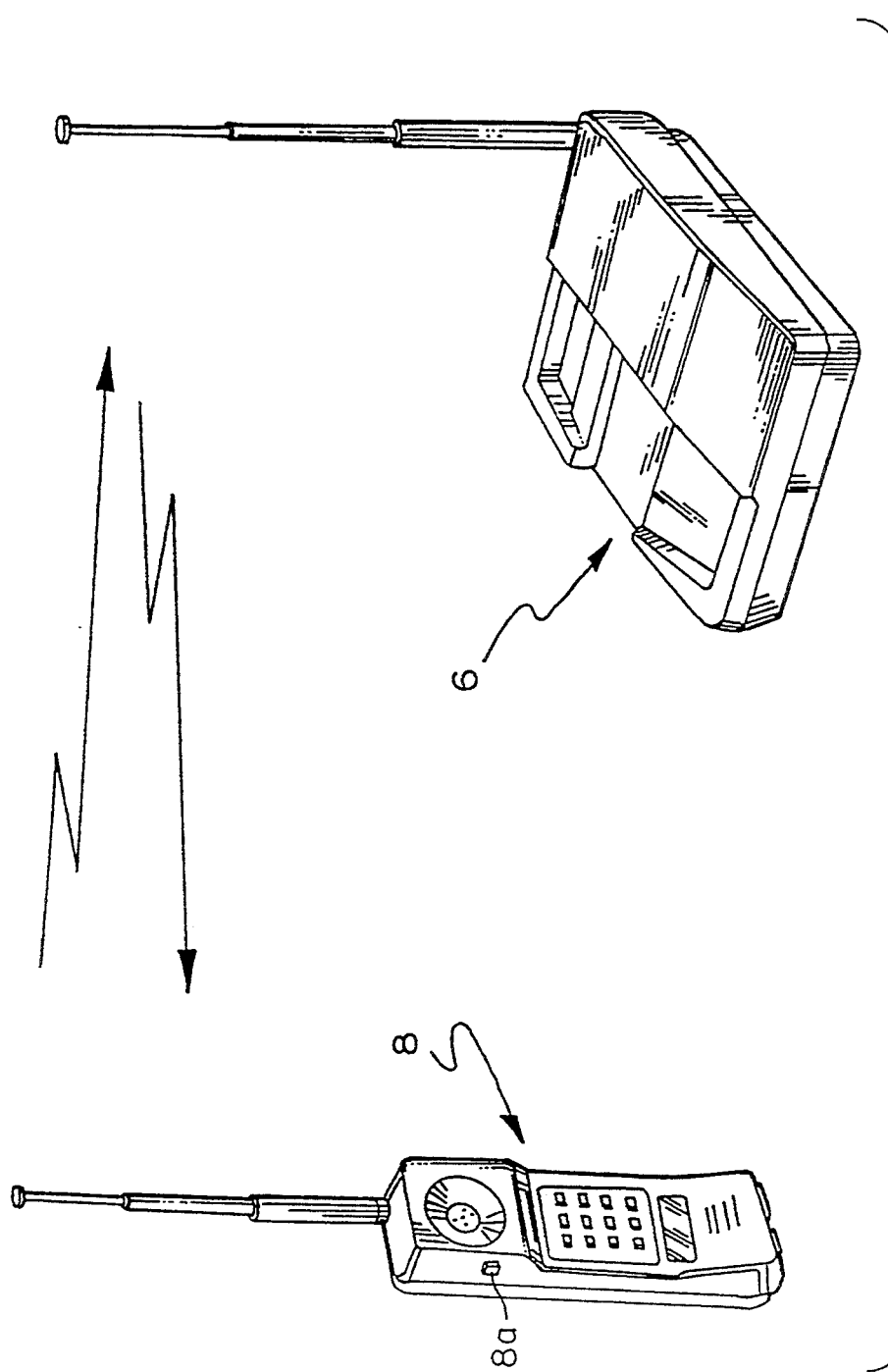
FIG. 1 is a general perspective view of a cordless telephone.
Figure 2:
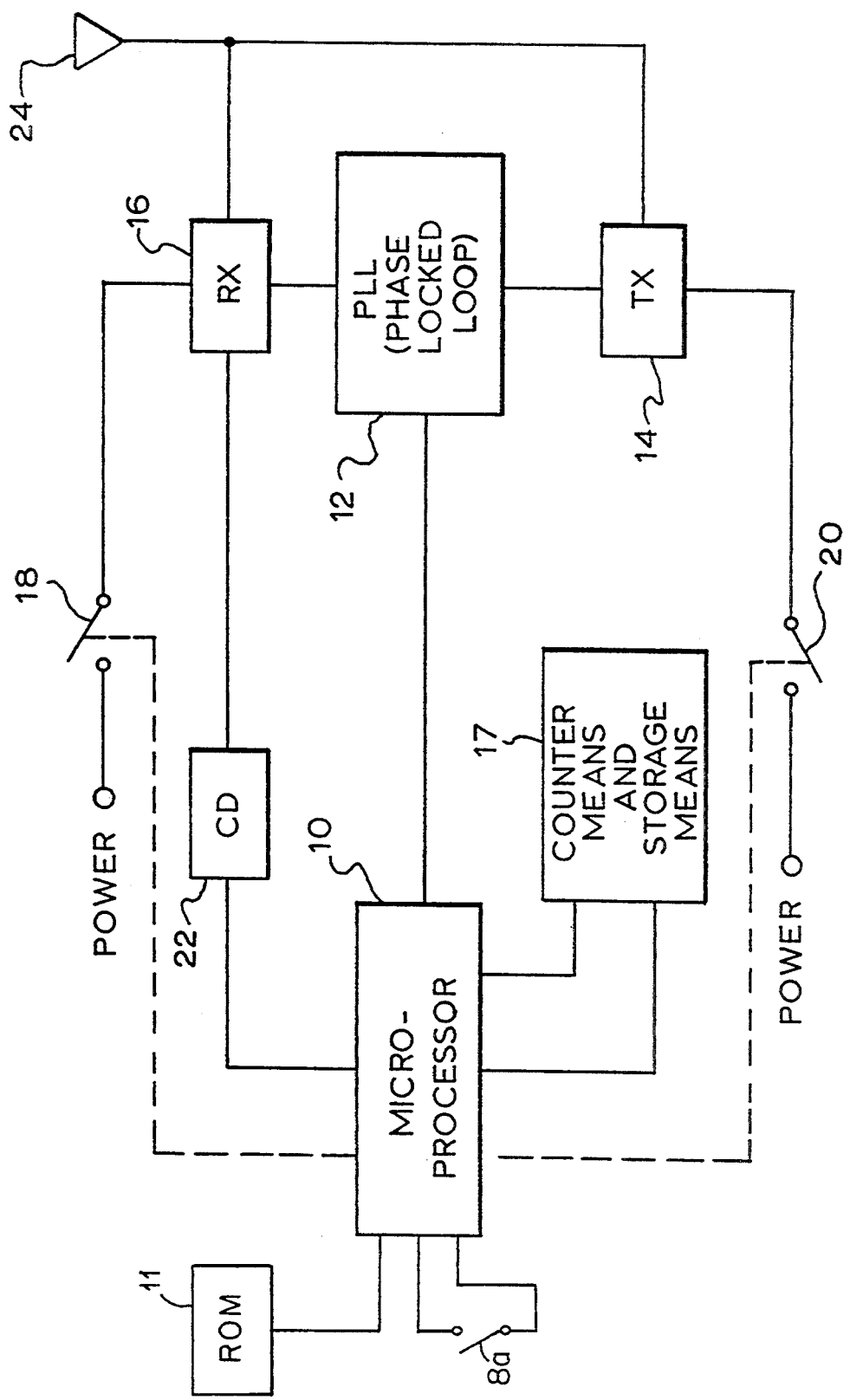
FIG. 2 is a schematic representation of the control circuitry.

The detailed operation of a cordless telephone is well known and will not be repeated here. In simplest terms and as shown in FIG. 1, the cordless telephone of the present invention comprises a base unit 6 connected to the telephone line and to a power supply, and a portable handset 8. A portable handset 8 allows audio connection to the telephone line via a radio link. The base unit 6 and the handset 8 each have a transmitter 14 and a receiver 16 for communicating with one another. A general block diagram of the control circuitry of a multichannel cordless telephone is shown in FIG. 2. This circuitry would be effectively duplicated in the base 6 and in the handset 8. Other circuitry, such as the telephone line interface on the base, and the microphone and earpiece circuits on the handset 8 are well known and will not be discussed here.

A microprocessor 10 provides basic control of the unit 6 and implements a scanning algorithm through its internal logic as instructed by a connected ROM 11. The microprocessor controls the PLL 12, which determines the operating frequency of the transmitter 14 and receiver 16. The microprocessor 10 is connected to and manipulates the contents of the counter means and storage means 17. The microprocessor 10 is also able to disconnect the power connections 18 and 20 to the receiver 16 and transmitter 14 circuits. This allows reduction of power consumption by only momentarily sampling the signal present on receiver 16. For example, if it takes 0.1 sec to sample a given channel, and three channels are to be scanned, the receiver 16 can be turned on for only 30% of the time. The microprocessor 10 senses the presence of a carrier signal (or an interference source) through its Carrier Detect (CD) 22 input. The signal is transmitted between the handset 8 and the base unit 6 through the antenna 24.

The operation of the present invention does not depart from the conventional cordless telephone other than in the means for selecting the channel to be used by the cordless telephone when engaged.

Figure 3:
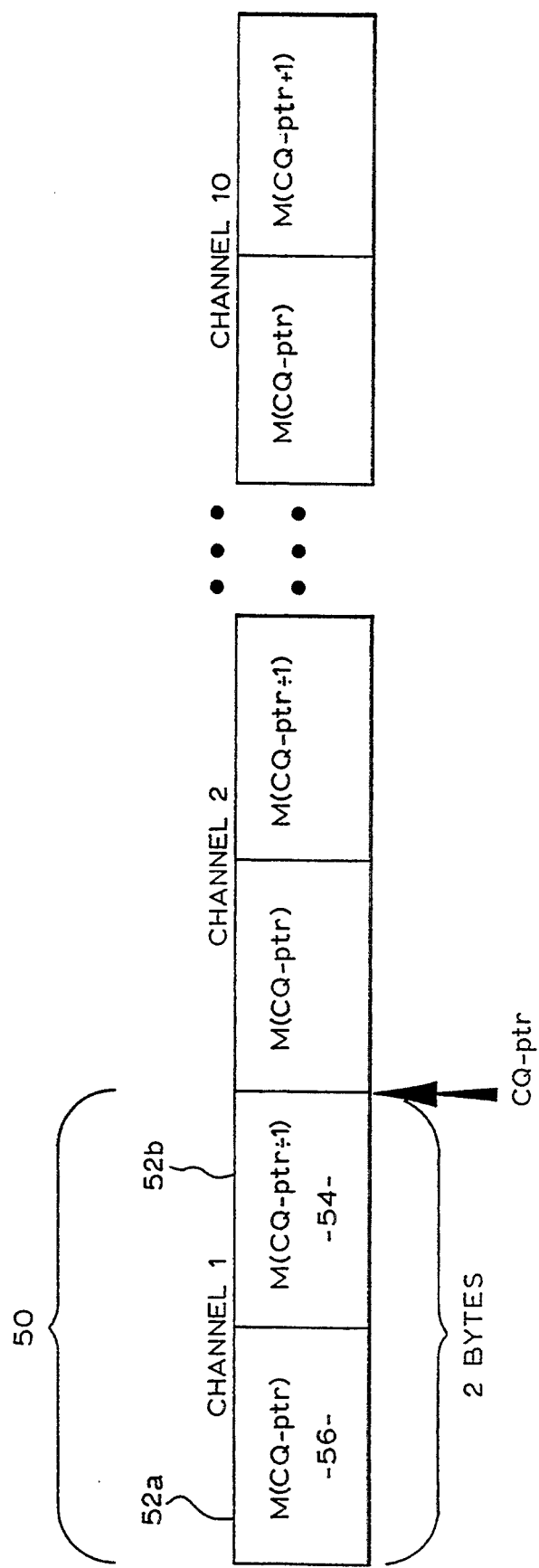
FIG. 3 represents the channel storage scheme in memory.
Figure 4:
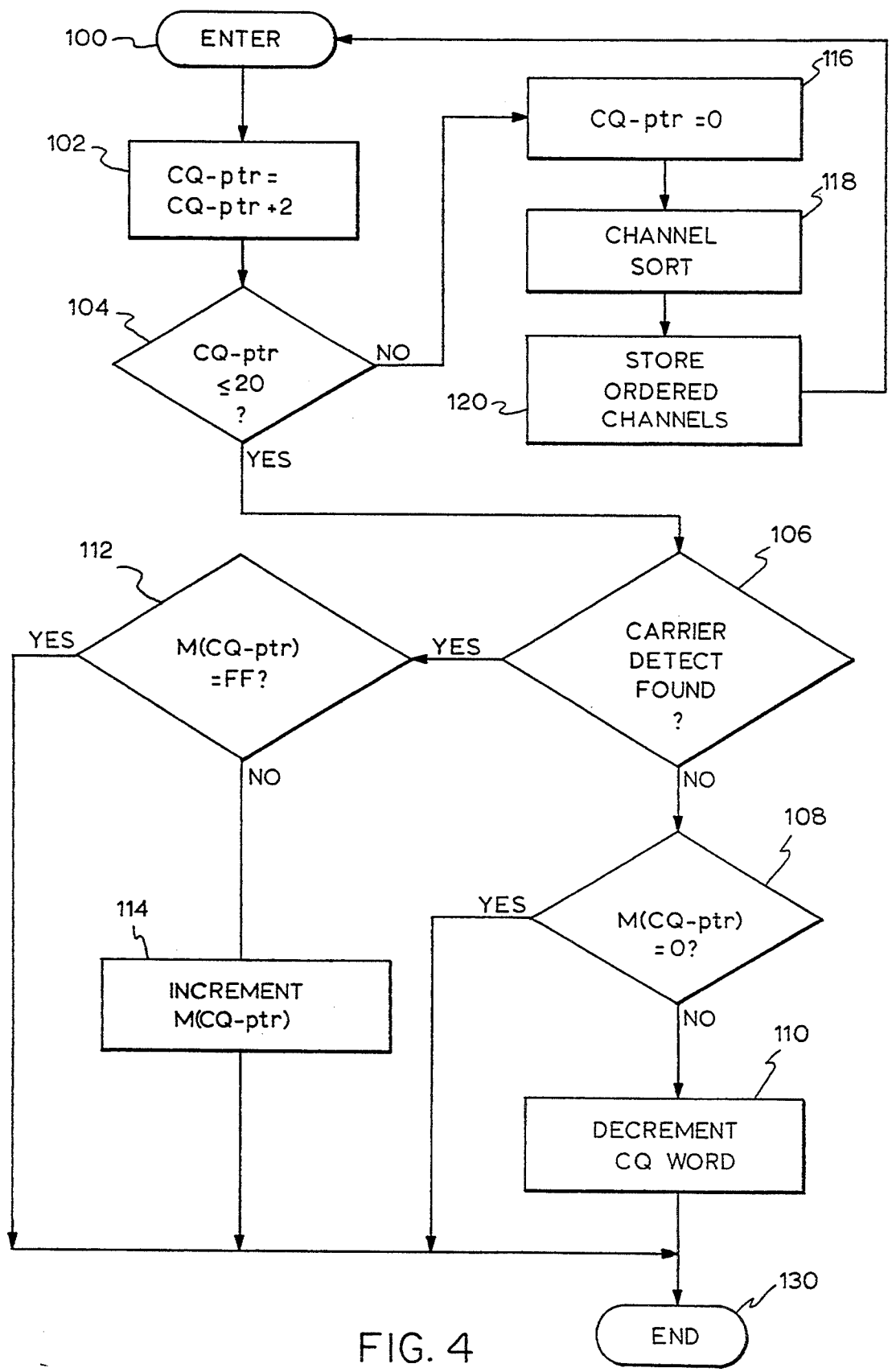
FIG. 4 is a flow chart illustrating the logic of the present invention.

With reference to FIGS. 3 and 4, the channel selector operation is described. During the standby mode of the cordless telephone, the channel spectrum is scanned at the rate of one channel every minute. In the scanning process, the microprocessor 10 tunes the receiver 16 through the PLL 12 to receive one of the available channels. A sample is taken of any signals (signifying interference) present on that tuned-in channel. The next channel's signal is then sampled when the microprocessor 10 selects the next channel by tuning the PLL 12 to that next channel's frequency or frequencies. This process is then repeated with channels being selected by the microprocessor 10, and samples of signals, if any, on those channels being taken to test for interference.

The scan cycle time for all ten channels is 10 minutes in a preferred embodiment. Therefore, each channel is scanned about 144 times a day and about 1,000 times a week. When more channels are available for usage, the scan cycle time would be correspondingly reduced in order to cover all the channels. The record of interference and noninterference of each channel found during the scanning is stored in memory 17, and given a preference, based on this record. The availability of a channel is determined by its cumulative history of interference. This is referred to as its Channel Quality.

Channel scanning circuitry is well known and can comprise the following. A receiver is present for reception of signals on the channels to be scanned. A tuner or tuners may be present to tune the channel scanner or receiver to different frequency bands, or channels. This tuning function may be accomplished by controlling a phase locked loop that determines the operating frequency of the receiver. Similarly, an adjustable capacitor may be used to control the resonance of a receiving circuit, thereby controlling the scanned frequency band. All three means for selecting a certain channel, or frequency band, are well known in the art.

Once the receiver is tuned to a frequency, signals incoming over the receiver on the selected frequency band may be analyzed for interference. By means of tuning to different channels, or frequency bands, certain segments of the electromagnetic spectrum used for radio transmissions can be sampled and analyzed for the presence of interference, third party communications, or clarity over those channels.

By sampling the channels for signals, the cordless phone incorporating the present invention determines the presence or absence of interfering signals on the sampled channels. Any signal not generated by the cordless phone is interference so far as the cordless phone is concerned. When the cordless phone is not being used, that is when it is in standby or idle mode, any signal sufficient to trigger the Carrier Detect, or CD 22, of the cordless phone is by necessity interference as that signal would interfere with the transmission and reception of the cordless phone were it to start using that channel. If the signal from a scanned channel does not activate the CD, then the channel is clear and has no interfering signals.

In the present invention, while scanning channels and sampling for signals, or lack thereof, counters corresponding to each channel are respectively updated to numerically reflect the cumulative history of the presence or absence of interference on the channels. The means by which radio frequency channels are scanned or tuned-in, the means by which signals are sampled, and the means by which a counter is updated, are all known in the art. The present invention resides not in the specific means used to perform these functions, but in their coordinated use for the ultimate selection of clear channels for use by the cordless phone.

The present invention takes into consideration in its determining the quality of a channel that statistically it is more likely that a channel will be free at any given time when sampled than it will be busy. This is for the obvious reason that telephones are not used very much during the late evening and early morning times when people are usually asleep. Therefore, an instance of interference will have a higher value as an indication of poor quality than an absence of the interference.

A simple way of recognizing and dealing with such an imbalance is to use an algorithm that adds a higher value in the memory for an interference signal than would be subtracted for a non-interference signal. Another way of stating this is by saying that in order to weight the cumulative representation on a particular channel, a positive number of greater absolute value is added for each detected occurrence of interference, while a negative number of lesser absolute value is added for each detected absence of interference. For example, every instance of interference would result in the value 5 being added to the counter of the channel and every instance of finding no interference during the sample would result in the value of 1 being subtracted from the counter.

The means used to change the count by incrementing or decrementing the counter are well known in the art, and include the microprocessor 10 of the cordless telephone implementing an algorithm through its internal logic. Such an algorithm may be stored in a ROM 11 associated with the microprocessor 10.

While such a system is simple in concept, it would have the tendency, if there were a sufficiently large number of samples, to drive the entire system in one direction or the other. In either case, the ability to segregate one channel from the other would be reduced or eliminated so that the ability to select a channel would be lost.

In one embodiment of the algorithm, more sophisticated than the linear addition and subtraction system described above, a weighted addition and subtraction is used which has the tendency to avoid the channel counter from reaching maximums, and if it does reach a maximum, cause it to retreat at a faster rate than when it was at a lower value. Such a system is considered a non linear value system in that it decreases the channel quality count faster when the count is high, and at a slower rate when it is low. Such a system tends to drive the count toward the middle values of the Channel Quality count where the system is operative.

Referring to FIG. 3, the base unit 6 maintains a counter 50 for indicating the Channel Quality usage for each channel 52a and 52b. The Channel Quality is represented within each counter as a distinct CQ word for each channel. The value of CQ is an indicator of the activity or the interference in that channel. The greater the value of CQ for a specific channel, the greater the likelihood of interference, and conversely, the lower the CQ value for a specified channel, the greater the likelihood of the channel being clear and available for use.

The CQ is divided into a low byte (CQlo) 54 and a high byte (CQhi) 56, each consisting of several bits, the exact number to be determined by design considerations of the desired embodiment. As an example, let us consider one such embodiment where CQlo and CQhi each consist of 8 bits each. During the scanning operation, if a carrier or interference is detected on a particular channel being scanned, then 1 is added to the value of the corresponding CQhi byte until it reaches the maximum predetermined value of FF in the hexadecimal notation. If no carrier or interference is detected for a channel when scanned, then (CQhi+1) is subtracted from the prior CQ of that channel to arrive at the new CQ; i.e., CQ(new)=(CQ−(CQhi+1)). As an example, if the CQ word was FF00 and no interference was detected, the new CQ value would be FE00 from the subtraction of 100 from FF00. Therefore, as the CQ count gets higher, the amount subtracted when no carrier or interference is detected on that channel, gets larger as well. The rationale behind such an implementation is that when a channel which might have experienced interference for a considerable length of time becomes clear, it becomes available for use within a reasonable time frame.

While we have shown one method that causes a rapid drop in the CQ count to enable faster access, it is emphasized that numerous other systems could be used to bring about the same or similar effect and all such methods would fall within the spirit and scope of the present invention. By adding and subtracting from the CQhi, rather than the CQlo, the system is more responsive to those changes.

While the above non linear system has been described in detail it is recognized that many other algorithms, linear and non linear, can be employed. For example, the value of an interference or non interference signal can be dependent on the time of the day, an interference signal being of more significance during the night hours than the day hours. Also, with an appropriate timer the algorithm could keep track of the most likely available channel at particular times of the day. In the simplest mode the device would have a day operation and a different nighttime operation.

The operation of the scanning routine is shown in FIG. 4. The routine is entered at 100 once every minute during the standby mode of the cordless telephone. The Channel Quality pointer, CQ-ptr 102 is a pointer to the CQ counter of the channels and since each CQ word is made up of two bytes (CQhi and CQlo), the increment of CQ-ptr+2 at 102 would move the pointer to the CQ counter of the next channel as shown by the arrow in FIG. 3. M(CQ-ptr) and M(CQ-ptr+1) are the values of CQhi and CQlo, respectively. If at 104 the CQ-ptr has a value of less than 20, indicating there are more channels, the routine checks for the carrier detect 106. If a carrier detect 106 has been found, M(CQ-ptr) of the channel is checked at 112 to see whether the cumulative value for the counter of that channel has reached the maximum count of FF. If it has, it means that the channel has been experiencing interference continuously and the routine ends at 130. However, if the value of the counter M(CQ-ptr) has not reached the maximum value FF, the CQhi is incremented at 114 by the value of 1 and the routine continues. If no carrier detect is encountered in the channel that is currently being scanned at 106, the routine examines at 108 the M(CQ-ptr) and if its value is zero, it means that the channel is clear and the routine ends. If no carrier is detected, but if the M(CQ-ptr) is not zero, CQ word is decremented by CQhi+1 at 110 and the routine ends.

If the CQ-ptr 104 reaches 20, it means that all the 10 channels have been scanned and therefore the CQ-ptr is set to zero 116 in order to begin the next scan cycle 100. The routine sorts the channels 118 of the CQ word values for all the channels and stores the sorted order of channel numbers in memory storage means 120 in an ordered channel list, so that the ones with the lower CQ values, clearer channels, are preferentially accessed or selected by channel selection means present in the handset 8 or base 10 upon activation of the cordless telephone.

One way to sort the channel counters is to have the microprocessor 10, as instructed by a ROM 11 or similar device, compare two different channel counters and determine which counter has the smallest value. The channel number corresponding to that channel value is then stored in the first memory position of an ordered channel list. The value of the channel counter corresponding to that channel is compared to another, different channel counter. The smaller of the two compared values is then stored in the first memory position of the ordered channel list. For a cordless telephone with ten channels, all ten values are compared with one another to determine which value is lowest. The channel number corresponding to the lowest value is then stored first in the ordered channel list.

Similarly, the remaining nine values are compared with one another, the lowest value of the nine representing the second clearest channel. The number of the second clearest channel is stored in the second memory position of the channel list.

In this manner, all ten positions of the channel list are occupied in descending order of channel clarity, the channels of least interference beginning the prioritized list while the channels of most interference end the prioritized list.

In cordless telephones with several available channels, the selection of one channel for use is accomplished by sampling a channel for clarity and if clear, then using that channel for handset/base transmission/reception. The order in which channels are selected in previous cordless telephones is frequently preset at the factory, with some units having manual channel selection. The present invention usurps this static channel selection arrangement by having the cordless telephone's channel selection means refer to a dynamic and environmentally adaptive channel list.

Channel selection means are currently known with respect to cordless telephones having several available channels. Upon activation, the apparatus of the present invention uses standard channel selection means used by cordless phones for selecting an interference-free channel from among several available channels. However, the prioritized list from which, or the sequence in which, the interference-free channel is chosen depends upon the electromagnetic environment local to the cordless telephone as the list or sequence is constructed to preferentially sample statistically clear channels over those statistically less clear.

One way of achieving channel selection means in the present invention is to use the microprocessor 10 to tune the PLL 12 to channels in the order set forth in the generated channel list. The microprocessor's 10 instructions could be stored in a ROM 11 associated with the microprocessor 10 and implemented upon activation of the handset 8 or base 6. The tuned channel is sampled for interference in a similar manner to that used in generating the ordered list. Due to the ordered list, success at finding a clear channel is enhanced as channels at the top of the list (the ones first sampled by the microprocessor 10 upon activation) have been found to be more consistently clear than channels lower on the list. When the microprocessor 10 successfully finds a clear channel, the handset 8 or base 6 can then use that channel for cordless telephonic communications.

Essentially committing the cordless telephone to the selected channel, the microprocessor 10 signals the PLL 12 to tune the transmitter 14 and receiver 16 to operate at the selected channel's frequency or frequencies.

In order to assure that the handset 8 and base 6 choose from the same list, either the handset or base can initially generate the list, then transfer a copy to its counterpart before the handset 8 or base 6 are separated. In this way, identical lists are assured. Such a transfer can be made by signals travelling through any electronic, electrical, or electromagnetic connection or coupling between the handset 8 or base 6. Further, the radio link between handset 8 and base 6 may be used to transfer copies of the ordered list using an error checking communications protocol. The list can be updated or modified if interference is found in any of the channels. For example, the handset may experience interference on one or more of the channels when carried outdoors or to a different room. This is a common occurrence and is generally attributable to the presence of a new source of interference that was too weak or undetectable at the original location. The handset would therefore send a request to the base for an updated list by designating all noisy channels to be deleted. The base acknowledges the request, deletes the noisy channels and sends a "command load" message to the handset. As soon as the handset receives the command load message and is ready for a new list, it sends an acknowledgement to the base, whereupon the base transmits the new channel numbers one by one after duly receiving an acknowledgement from the handset for each one of them. When the desired number of the clearest channels have been received by the handset, it sends out a confirmation signal to the base which sends out a final acknowledgement signal. This arrangement ensures that the clearest channels are used for communication and also that the handset and the base maintain an identical list at all times.

It is conceivable to have both handset and base generating their own lists while separated. In this case, the activated portion of the cordless telephone needs to first establish a communication link with its remote counterpart before engaging in telephonic communications. An advantage of this is that each counterpart of the cordless telephone generates an ordered channel list in response to its local environment. A channel subsequently used would be one generally clear for both handset 8 and base 6, and not just for the local environment surrounding the base-cradled handset. In this case, the handset 8 also includes the means for scanning and determining interference free channels, similar to that provided in the base 6.

When separated cordless handset 8 and base 6 units later establish a signal link, the best channel for signal exchange is selected by conventional channel selection means that refer to the sorted channel order stored in the memory storage means 17. Before using one of the channels, that channel is checked for absence of interference.

If a predetermined number of channels have a count of zero, the cordless telephone needs to scan only those channels until they experience interference. This method increases the battery life of the cordless telephone substantially by obviating the necessity to scan all the 10 channels continuously.

While the system has been described as prioritizing all of the channels, it is possible to have less than all of the channels prioritized, the system reverting to conventional operation of a scanning cordless telephone thereafter. For example, the system may scan all of the available channels and the three channels having the lowest CQ will be prioritized. When the telephone is activated, those three channels will be checked to see if they are clear. If all three are experiencing interference, then the remaining seven channels would be scanned in the conventional manner. Such a system assures that any malfunction will not interfere with the operation of the cordless telephone and reduce the components required for the device. The information about the preferred channels can be conveyed to the handset 8 by means of any one of the well known communication protocols, and viceversa.

By having both the base and the handset scan all the three prioritized channels, we can ensure that communication would be established between the handset and the base with greater reliability. However, this would significantly reduce the life of the handset battery. As an advancement of the three channel scanning method, an alternative scheme is proposed wherein the handset 8 scans only the single clearest channel of three clearest channels while the base scans all three channels. During the standby mode, the handset 8 signals the base 6 that it is scanning a particular one of the three clearest channels, designates it as the preferred channel and updates the base 6 when it begins to scan a different channel. If activated first, the base 6 transmits on the preferred channel in order to communicate with the handset 8. If the handset 8 is activated first, it may transmit on any of the three clear channels as the base 6 is continuously scanning all three of those channels. By scanning just one channel during the standby mode instead of the usual three, the battery life is greatly increased. The capability for locking in one of the three clearest channels is still preserved, albeit with the possibility of a slight but an acceptable delay.

Several designs like those described above could strike a balance between channel quality and battery life in the handset 8. Two channels may be scanned by the handset 8 in order to more quickly assure a clear channel, however the battery will power the handset 8 for a shorter period of time before needing recharging.

Although we have described the implementation of the algorithm on the base unit 6, a similar implementation on the handset 8 would be an obvious and a logical extension and would therefore fall within the scope of the present invention.

Selection and Usage of Channel Subset Technique

Figure 5:
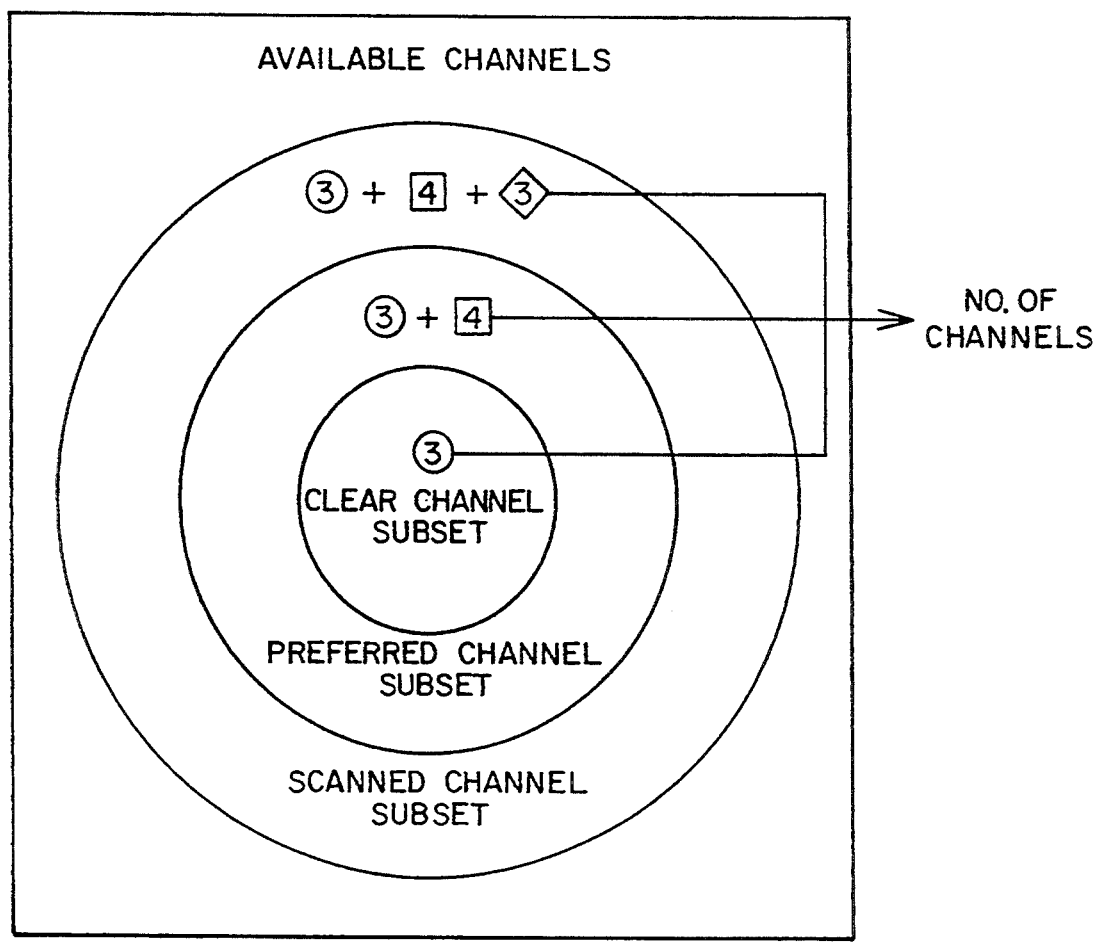
FIG. 5 is a Venn diagram illustrating the ordered subsets of channels.
Figure 6:
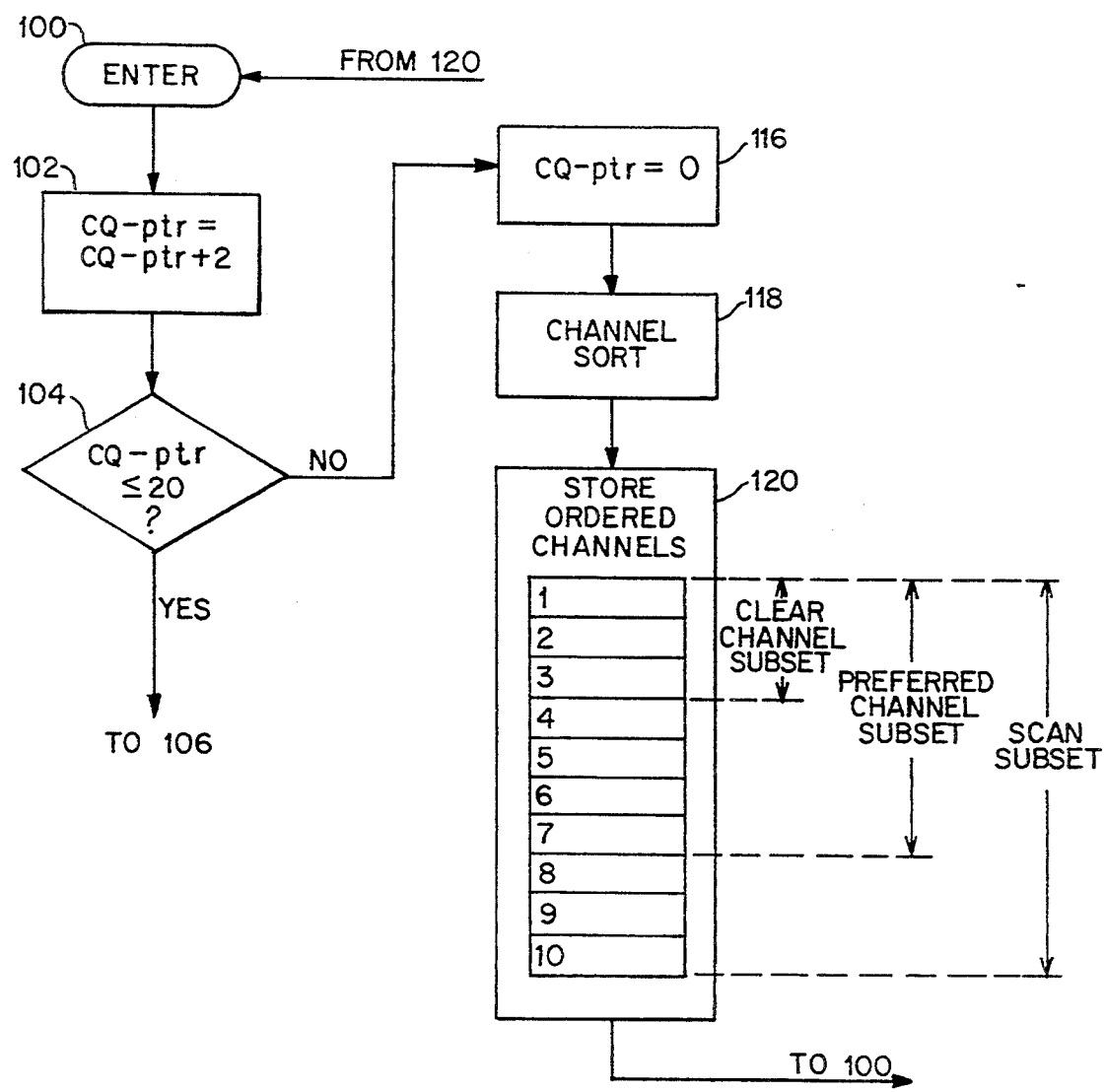
FIG. 6 is a flow chart illustrating the logic of the second embodiment of the present invention.

Among all the channels available for usage, according to another feature of the present invention shown in FIGS. 5 and 6, a limited subset of channels called a scan subset, is selected at the time of powerup. As an example, in an environment where 25 channels are available for usage by cordless phones, the system selects the 10 clearest channels that it encounters upon power up. Among these first ten clear channels, the system further selects a subset of preferred channels (preferred channel subset) on which scanning is performed most of the time. This preferred channel subset may consist of, for example, the clearest 7 of the 10 channels. See FIG. 5. In a further enhancement, if any channel or channels of the preferred channel subset are encountered that experience no interference whatsoever over an extended period of time, they are further assigned to a clear channel subset which may contain a maximum of 3 such channels. It may not be possible to find channels that experience no interference whatsoever in any extended period of time. So typically, the clear channel subset is normally made up of the 3 clearest channels from the preferred channel subset. See FIG. 5. All communication between the base 6 and the handset is always carried out from a channel in this clear channel subset. If and only if interference is experienced on all of the channels in the clear channel subset, then the system attempts to choose one of the channels from the next level (i.e., the preferred channel subset). The staggered sets of channels representing increasingly clearer channels (within subsets) represents a highly efficient method for communicating over the clearest channel with the least amount of delay. This becomes a critical issue specially when one clear channel must be chosen from a large number of available channels. With the above-described technique of the present invention, the time to lock on to a clear channel is greatly reduced. Since the subsets of channels (FIG. 5) are created based on long term statistics of scanning all the channels and are constantly updated, they are dynamic in nature and continue to reflect the channel usage patterns of a neighborhood. The subsets are shown in the form of a Venn diagram in FIG. 5. It is pointed out that the staggered list is dynamic in nature and may be periodically changed using the process generally shown in FIG. 4, modified as shown in FIG. 6. Except for the modifications to block 120 shown in FIG. 6, FIG. 6 is the same as FIG. 4. Channels that become noisy will be either taken off the list or transferred between the subsets, while clearer channels take their respective places.

This staggered subset of channels is extremely important in accessing a clear channel in situations where there are a large number of channels to choose from. An example of operation is given below.

If, for example, using a cordless phone with manual channel switching capability, the user experiences interference on a particular channel during conversation, he is expected to manually switch to a different channel. The most common implementation of manual switching in the prior art is to move the communication to the next higher channel number. For example, suppose that the user is currently on channel 2 and finds it to be noisy. As soon as he activates the channel selection key, the communication would be transferred to channel 3, even if channel 3 is noisier than the previous channel 2. The user would have to keep switching channels in a sequential order until one is found that is clear. A significant improvement is realized in cordless telephone models like the PhoneMate 2900 (manufactured by the Assignee of the present application) and AT & T 5600 wherein, activating the channel selection button would automatically transfer communication to the next channel in a prioritized list that is likely to have the least amount of interference. For example, if the clearest channels are 2, 6 and 7 and suppose that the user experiences interference on channel 2 during conversation. Using the techniques of the PhoneMate 2900 or AT & T 5600 cordless telephones, activating the channel selection key would cause the communication to be transferred from channel 2 to channel 6 directly, and thereafter to channel 7, thereby avoiding unnecessary delays. If for some reason all of the channels in the prioritized list are found to be noisy, manual switching would revert to the original prior art method of sequential scanning each channel, one after the other, even if they are not interference free. This might cause an unacceptable delay and inconvenience if there are a large number of channels to choose from. By having staggered subsets of channels, as in the above-described technique of the present invention (FIGS. 5 and 6), and by using the automatic scanning and channel switching techniques of the present invention, this problem can be avoided. In the present invention, if the clearest subset (clear channel subset) containing say, 3 channels is suddenly found to be noisy, the system would jump to the next clearest subset (preferred channel subset in FIG. 5) of for example, 7 channels, and choose one of them rather than try to sequentially scan all of the 25 or 30 or so channels that may be available and choose the first clear channel that is encountered.

One other consequence of using the subsets of channels in the manner described is the enormous saving in memory space. Instead of having to keep track of all of the available channels, only limited subsets are stored and their status is periodically updated in memory. Battery power consumption is also greatly reduced.

In all of the above-described embodiments, the scanning for interference free channels is conducted during idle periods when the telephone is not in use for communication or carrying out a conversation. When the telephone is in use for communication, the system generally cannot tell the difference between normal communication and interference. Therefore, the interference checking is carried out when the system is not being used (i.e., during the idle time). During use of the system, if the user hears interference on the channel which is currently being used, the user preferably manually depresses a channel switching button 8a on the handpiece 8 to cause the system to switch to the next interference free channel (in the clear channel subset). Switch 8a is connected to the microprocessor in the handpiece 8 (schematically shown in FIG. 2), which signals the system to switch to the next clear channel in the clear channel subset. Such manually initiated switching takes place so quickly that it is not detectable by the user. In the above example, if the clear channel subset includes channels 2, 6 and 7, if communication is first carried out on channel 2, and the user hears interference during conversation, the switch 8a is depressed and communication is switch to channel 6 (the next clear channel). If, during further use, the user detects interference on channel 6, the switch 8a is activated by the user again and the system switches to channel 7 (the next clear channel in the clear channel subset). Assuming that conversation continues and interference is detected on channel 7, and the switch 8a is activated again, the system will then switch to the first clear channel in the next subset (the preferred channel subset). Operation then continues as described above for the channels in the preferred channel subset. Thus, using the system of the present invention, even when manual switching is carried out during conversation, only the clearest channels will be utilized.

According to a simplified version of the present invention, the apparatus may utilize only two subsets, for example the scan subset and preferred channel subset of channels. In such a simpler arrangement, the channel over which communication is to be carried out is selected from the preferred channel subset. Switching between channels is automatically conducted as described above within the channels in the preferred channel subset. If all of the channels in the preferred channel subset are found to be noisy, then switching would revert to the scan channel subset. This technique is similar to that described hereinabove, with respect to FIG. 5, except that only two subsets (instead of the three subsets shown in FIG. 5) are used.

While the invention has been described above with respect to specific techniques and implementations, it should be clear that the invention is not limited to the specific disclosed embodiments, and that various modifications and alterations can be made within the scope of the invention as defined in the appended claims.

What is claimed is:

1. In a cordless telephone having a handset, a base unit, a plurality of communication channels for reception and transmission between said handset and base unit, and sampling means for sampling the presence of interference on said communications channels, a method of selecting a relatively interference free channel comprising the steps of:

activating said sampling means for sampling said plurality of channels;

selecting a scan subset of channels out of said plurality of channels, said scan subset of channels comprising a first group of clear channels sampled by said sampling means;

repeatedly sampling said scan subset of channels with said sampling means to detect occurrences of interference associated with each channel in said scan subset of channels;

storing data corresponding to a number of detected occurrences of interference associated with each channel in said scan subset of channels, based on said repeated sampling;

assigning to each channel in said scan subset of channels a cumulative value associated with a likelihood of interference being found on that channel, based on the stored data corresponding to the number of detected occurrences of interference associated with that channel;

selecting a preferred channel subset of channels out of said scan subset of channels, on the basis of said cumulative value assigned to each channel, said preferred channel subset including fewer channels than said scan subset of channels; and selecting a clear channel out of said preferred channel subset, said clear channel comprising a channel on which said sampling means detects substantially no interference over an extended period of time.

2. The method of claim 1, wherein said step of selecting a clear channel comprises:

selecting a clear channel subset of channels out of said preferred channel subset of channels, on the basis of said cumulative value assigned to each channel; said clear channel subset comprising channels on which said sampling means detects substantially no interference over an extended period of time; and then selecting said clear channel out of said clear channel subset.

3. The method of claim 2, further comprising the step of updating the clear channel subset by removing from said clear channel subset a channel on which said sampling means detects an occurrence of interference.

4. The method of claim 2, further comprising the steps of:

deleting from said clear channel subset a channel on which said sampling means detects an occurrence of interference;

reselecting a clear channel, from said preferred channel subset, on which said sampling means detects no interference over an extended period of time; and assigning said reselected clear channel to said clear channel subset.

5. The method of claim 2, wherein all communication between said handset and said base unit is carried out on a channel in said clear channel subset.

6. The method of claim 2, wherein all communication between said handset and said base unit is carried out on a channel in said clear channel subset when said clear channel subset includes at least one of said plurality of channels, and on a channel in said preferred channel subset when none of the channels of said clear channel subset is interference free.

7. The method of claim 1, wherein said cordless telephone has a user-operated switch which is manually operable by a user for manually switching channels, further comprising the step of manually switching, by operation of said user-operated switch, during a telephone conversation, among channels of said preferred channel subset, when a user hears interference on a current channel on which communication is being conducted.

8. The method of claim 7, wherein:

said manual switching is conducted among the channels in said preferred channel subset in a given order; and manual switching is conducted within the scan channel subset after all of the channels in said preferred channel subset have been switched.

9. The method of claim 2, wherein said cordless telephone has a user-operated switch which is manually operable by a user for manually switching channels, further comprising the step of manually switching, by operation of said user-operated switch, during a telephone conversation, among channels of said clear channel subset, when a user hears interference on a current channel on which communication is being conducted.

10. The method of claim 9, wherein:
said manual switching is conducted among the channels in said clear channel subset in a given order; and
manual switching is conducted within said preferred channel subset after all of the channels in said clear channel subset have been switched.

11. A multichannel cordless telephone having a handset and a base unit, comprising:
sampling means for sampling frequency bands of a plurality of communication channels and for detecting the presence of interference on each sampled channel;
scan subset selecting means for selecting a scan subset of said plurality of channels comprising a first group of clear channels sampled by said sampling means, said scan subset of said plurality of channels being repeatedly sampled by said sampling means;
counter means for storing a cumulative count value associated with each channel in said scan subset, said count value corresponding to occurrences of interference detected by said sampling means;
preferred channel subset selecting means for selecting a preferred channel subset of channels out of said scan subset on the basis of said cumulative value assigned to each channel; and
clear channel selecting means for selecting a clear channel out of said preferred channel subset, said clear channel comprising a channel on which said sampling means detects substantially no interference over an extended period of time.

12. The multichannel cordless telephone of claim 11, wherein said clear channel selecting means comprises:
means for selecting a clear channel subset of channels out of said preferred channel subset, said clear channel subset comprising channels on which said sampling means detects substantially no interference over an extended period of time; and
means for selecting said clear channel out of said clear channel subset.

13. The multichannel cordless telephone of claim 12, wherein said clear channel subset selecting means further comprises updating means for updating the clear channel subset by removing from said clear channel subset a channel on which said sampling means detects an occurrence of interference.

14. The multichannel cordless telephone of claim 12, wherein said clear channel subset selecting means further comprises:
means for deleting from said clear channel subset a channel on which said sampling means detects an occurrence of interference; means for reselecting a clear channel from said preferred channel subset on which said sampling means detects no interference over an extended period of time; and
means for adding said reselected clear channel to said clear channel subset.

15. The multichannel cordless telephone of claim 12, further comprising control means for controlling communication between said handset and said base unit to be carried out on a channel in said clear channel subset.

16. The multichannel cordless telephone of claim 12, further comprising control means for controlling all communication between said handset and said base unit to be carried out on a channel in said clear channel subset when said clear channel subset includes at least one of said plurality of channels, and on a channel in said preferred channel subset when none of the channels of said clear channel subset interference free.

17. The multichannel cordless telephone of claim 11, further comprising manually operable switching means for enabling a user, during a telephone conversation, to manually switch among channels of said preferred channel subset when the user detects interference on a current channel on which communication is being conducted.

18. The multichannel cordless telephone of claim 17, wherein said manually operable switching means includes:
means for manual switching among the channels in said preferred channel subset in a given order; and
means for manually switching among channels of said scan channel subset after all of the channels in said preferred channel subset have been switched.

19. The multichannel cordless telephone of claim 12, further comprising manually operable switching means for enabling a user, during a telephone conversation, to manually switch among channels of said clear channel subset when the user detects interference on a current channel on which communication is being conducted.

20. The multichannel cordless telephone of claim 19, wherein said manually operable switching means includes:
means for manual switching among the channels in said preferred channel subset in a given order; and
means for manually switching among channels of said preferred channel subset after all of the channels in said clear channel subset have been switched.

21. In a cordless telephone having a handset and a base unit, said cordless telephone having multiple channels of reception and transmission, and sampling means for sampling the presence of interference on said channels during a standby mode of operation, and channel selection means including storage means for storing an ordered list representing interference associated with each of said channels, a method of selecting a relatively interference free channel during idle time of the cordless telephone, comprising the steps of:
repeatedly sampling at least a plurality of channels;
storing a number of occurrences of interference associated with each channel in said sampled channel a cumulative value associated with the likelihood of interference being found on said sample channel; and
automatically selecting a channel for receiving or transmitting most likely to not have interference on said selected channel based on said assigned cumulative values.

22. The method of claim 21, wherein the step of storing the number of occurrences of interference and assigning to said channel a cumulative value, further comprises:
assigning a cumulative value based upon the number of occasions that interference is detected on said channel when said channel was sampled.

23. In a cordless telephone, a method for selecting an interference free channel for signal communication between handset and a base unit of the cordless telephone during idle time of the cordless telephone, the steps comprising:

sampling at least two channels of said cordless telephone for interference;

storing cumulative representations of interference detected on said sampled channels;

sorting said stored cumulative representations of interference in order of recorded interferences;

generating and storing a list of channel numbers corresponding to said sorted order of said cumulative representations of interference; and automatically selecting a channel for cordless telephone signal exchange between said handset and base based upon said sorted channel number list.

24. The method for selecting an interference free channel of claim 23, wherein the step of sampling at least two channels for interference comprises sampling said at least two channels for interference only while said cordless telephone is in a idle mode.

25. The method for selecting an interference free channel of claim 23, wherein said step of storing cumulative representations of interference detected on said sampled channels, comprises:

storing said cumulative representations of interference in a counter means; and adding a weighted number to the cumulative representation in said counter means, said number being weighted to facilitate selection of an interference free channel.

26. The method for selecting an interference free channel of claim 25, wherein the step of adding a weighted number comprises:

adding positive numbers to a higher byte of said cumulative representation in said counter means when interference is detected on said corresponding channel; and adding a negative number to the entirety of said cumulative representation in said counter means when interference is not detected on said corresponding channel.

27. The method for selecting an interference free channel of claim 26, wherein said positive number has a higher magnitude than said negative number.

28. The method for selecting an interference free channel of claim 26, wherein the step of adding a negative number to said counter means further comprises:

taking the value of a higher byte of said cumulative representation in said counter means;

adding the number one to said higher byte value to get a resulting value; and adding the negative of said resulting value to the entirety of the value in said counter means when interference is not detected on said corresponding channel.

29. A multichannel cordless telephone having a base and a handheld transceiver, comprising:

sampling means associated with said cordless telephone for sampling the frequency bands of a plurality of channels and detecting the existence of interference on each said channel sampled;

counter means for storing counts corresponding to each channel of said plurality of said channels;

tuning means for selectably tuning the cordless telephone to one of said channels, said sampling means being coupled to said tuning means, whereby said tuned channel is sampled for interference by said sampling means;

count changing means for changing the count of said counter means coupled to said sampling means and said counter means, said count changing being responsive to detection of interference on said channels during said sampling;

comparison means for comparing the value of counts for different channels stored in said counter means, and for generating an ordered list therefrom, said comparison means being coupled to said counter means; and channel selection means, coupled to said counter means, and including means for automatically selecting, during idle time of the cordless telephone, an available channel from said ordered list generated by said comparison means, the selected available channel having the lowest count; and wherein said counter means stores a value indicative of the number of detected interferences on said selected available channel.

30. A multichannel cordless telephone having a base and a handheld transceiver, comprising:

sampling means associated with said cordless telephone for sampling the frequency bands of a plurality of channels and for detecting the existence of interference on each said channel sampled;

counter means for storing counts corresponding to each channel of said plurality of said sampled channels;

tuning means for selectably tuning the cordless telephone to one of said channels, said sampling means being coupled to said tuning means, whereby said tuned channel is sampled for interference by said sampling means;

count changing means, coupled to said sampling means and to said counter means, for changing the count of said counter means, said count changing means being responsive to detection of interference on said channels during said sampling for changing said count;

comparison means for comparing the value of counts for different channels stored in said counter means, and for generating an ordered list therefrom, said comparison means being coupled to said counter means; and channel selection means, coupled to said counter means, and including means for automatically selecting, during idle time of the cordless telephone, an available channel from said ordered list generated by said comparison means, the selected available channel having the lowest count; and wherein said counter means stores a value indicative of the number of occurrences that interference occurs on said selected available channel, said value increasing more with each instance of interference than it decreases with each instance of non interference.

31. A multichannel cordless telephone having a base and a handheld transceiver, comprising:

sampling means associated with said cordless telephone for sampling the frequency bands of a plurality of channels and for detecting the existence of interference on each said channel sampled;

counter means for storing counts corresponding to each channel of said plurality of said sampled channels;

tuning means for selectably tuning the cordless telephone to one of said channels, said sampling means being coupled to said tuning means, whereby said tuned channel is sampled for interference by said sampling means;

count changing means, coupled to said sampling means and to said counter means, for changing the count of said counter means, said count changing means being responsive to detection of interference on said channels during said sampling for changing said count;

comparison means for comparing the value of counts for different channels stored in said counter means, and for generating an ordered list therefrom, said comparison means being coupled to said counter means; and channel selection means, coupled to said counter means, and including means for automatically selecting, during idle time of the cordless telephone, an available channel from said ordered list, the selected available channel having the lowest count; and wherein when one of said counts stored in said counter means is decremented, said count is decremented by a number that increases in value with increasing values of said count stored in said counter means.

* * * * *